United States Patent  
Higuchi et al.

(10) Patent No.: US 12,187,343 B2  
(45) Date of Patent: Jan. 7, 2025

(54) VEHICLE BODY LATERAL SECTION STRUCTURE AND METHOD OF MANUFACTURING VEHICLE BODY LATERAL SECTION STRUCTURE

(71) Applicant: HONDA MOTOR CO., LTD., Tokyo (JP)

(72) Inventors: Tsuyoshi Higuchi, Wako (JP); Kosaku Tomozawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 271 days.

(21) Appl. No.: 17/914,370

(22) PCT Filed: Dec. 23, 2020

(86) PCT No.: PCT/JP2020/048242  
§ 371 (c)(1),  
(2) Date: Sep. 26, 2022

(87) PCT Pub. No.: WO2021/210220  
PCT Pub. Date: Oct. 21, 2021

(65) Prior Publication Data  
US 2023/0108511 A1    Apr. 6, 2023

(30) Foreign Application Priority Data

Apr. 17, 2020    (JP) .................................. 2020-073874

(51) Int. Cl.  
*B62D 25/02*    (2006.01)  
*B62D 27/02*    (2006.01)
(52) U.S. Cl.  
CPC ........... *B62D 25/02* (2013.01); *B62D 27/023* (2013.01)

(58) Field of Classification Search  
CPC ...... B62D 25/02; B62D 25/04; B62D 27/023; B62D 27/02; B62D 27/026; B62D 29/007; B62D 29/008  
(Continued)

(56) References Cited

U.S. PATENT DOCUMENTS

2014/0152053 A1    6/2014    Watanabe et al.  
2019/0176902 A1    6/2019    Kagami et al.

FOREIGN PATENT DOCUMENTS

CN    208393480    1/2019  
CN    109895860    6/2019  
(Continued)

OTHER PUBLICATIONS

Chinese Notice of Allowance for Chinese Patent Application No. 02080098657.X mailed Mar. 9, 2024.  
(Continued)

*Primary Examiner* — Dennis H Pedder  
(74) *Attorney, Agent, or Firm* — Amin, Turocy & Watson, LLP (57) ABSTRACT

A vehicle body lateral section structure includes: a side panel outer (2) that is made of an aluminum alloy; a reinforcing member (4) that is made of steel and overlaps inside the side panel outer (2); an inner panel (3) that is made of steel and overlaps inside the reinforcing member (4); a plurality of mechanical coupling portions (5) that are provided at an interval (P1) of 40 mm or more and 80 mm or less in a longitudinal direction of the opening flange; and resistance welded portions (6) that are provided between the plurality of mechanical coupling portions (5) in the longitudinal direction to join the reinforcing member (4) and the inner panel (3) to each other in a state where the side panel outer (2), the reinforcing member (4), and the inner panel (3) overlap each other in three layers.

11 Claims, 7 Drawing Sheets

(58) Field of Classification Search
USPC ........ 296/146.9, 193.05–7, 23.01, 3, 29, 30, 296/191
See application file for complete search history.

(56) References Cited

FOREIGN PATENT DOCUMENTS

| | | |
|---|---|---|
| JP | 2011-105102 | 6/2011 |
| JP | 2014-073798 | 4/2014 |
| JP | 2015-101254 | 6/2015 |
| JP | 2018-149828 | 9/2018 |
| WO | 2013/008515 | 1/2013 |

OTHER PUBLICATIONS

Japanese Notice of Allowance for Japanese Patent Application No. 2022-515204 mailed Feb. 7, 2023.
International Search Report for International Application No. PCT/JP2020/048242 mailed on Mar. 23, 2021, 4 pages.
Chinese Notice of Allowance for Chinese Patent Application No. 202080098657.X mailed Mar. 9, 2024.

VEHICLE BODY LATERAL SECTION STRUCTURE AND METHOD OF MANUFACTURING VEHICLE BODY LATERAL SECTION STRUCTURE

TECHNICAL FIELD

The present invention relates to a vehicle body lateral section structure and a method of manufacturing a vehicle body lateral section structure.

BACKGROUND ART

A configuration in which an upper portion of a vehicle body lateral section is provided with a roof side portion having a closed cross section that is a vehicle body frame by arranging an inner panel extending in a front-rear direction of a vehicle body, arranging a side panel outer outside the inner panel, and placing a reinforcing member therebetween is known. Various techniques for coupling a plurality of plate members forming a closed cross section and for coupling the plate members to a member on a side of the vehicle body in the roof side portion have been proposed.

For example, a configuration which includes a side panel outer that is made of aluminum for weight reduction, an inner panel that is made of steel and is joined to the side panel outer via a first joining portion, a roof panel that is also made of aluminum for weight reduction and is joined to the side panel outer via a second joining portion is disclosed in Patent Literature 1 (Japanese Unexamined Patent Application, First Publication No. 2018-149828). The first joining portion and the second joining portion are separated from each other.

According to the technique described in Patent Literature 1, the roof panel made of aluminum is indirectly connected to the inner panel made of steel via the side panel outer made of aluminum. As a result, a strain generated in the roof panel made of aluminum due to a difference in a coefficient of linear expansion between aluminum and steel can be absorbed by the side panel outer made of aluminum.

SUMMARY OF INVENTION

Technical Problem

However, in the technique described in Patent Literature 1, since rivet coupling used for joining dissimilar materials such as aluminum and steel is a method of overlapping and coupling a plurality of plate members at once, when a roof arch and the inner panel are coupled with each other, coupling with the inner panel can be performed from only one inner side of a vehicle interior, and thus it is difficult to increase an attaching strength of the roof side portion. Therefore, from a viewpoint of increasing a coupling strength of the roof side portion and improving the rigidity of the vehicle body lateral section structure, the related art has a problem.

Aspects of the present invention provide a vehicle body lateral section structure and a method of manufacturing a vehicle body lateral section structure capable of improving rigidity as compared with the related art in vehicle body weight reduction of a monocoque structure made of steel using aluminum.

Solution to Problem (1) According to an aspect of the present invention, there is provided a vehicle body lateral section structure including: a side panel outer that is made of an aluminum alloy and forms an opening flange having a door opening of a vehicle body; a reinforcing member that is made of steel and overlaps inside the side panel outer in a vehicle width direction of the vehicle body; an inner panel that is made of steel and overlaps inside the reinforcing member in the vehicle width direction; a plurality of mechanical coupling portions that are provided at an interval of 40 mm or more and 80 mm or less in a longitudinal direction of the opening flange in a state where the side panel outer and the reinforcing member are adhered to each other with an adhesive to couple the side panel outer and the reinforcing member with each other through mechanical coupling; and welded portions that are provided between the plurality of mechanical coupling portions in the longitudinal direction to join the reinforcing member and the inner panel to each other in a state where the side panel outer, the reinforcing member, and the inner panel overlap each other in three layers.

(2) In the aspect of (1), the interval between the mechanical coupling portions in the longitudinal direction may be larger than an interval between the welded portions in the longitudinal direction.

(3) In the aspect of (1) or (2), the welded portions may be provided at a corner portion of the opening flange corresponding to a corner portion of the door opening.

(4) In the aspect of any one of (1) to (3), an upper portion of the opening flange may have a three-layer structure in which the side panel outer, the reinforcing member, and the inner panel overlap each other, and a lower portion of the opening flange may have a two-layer structure in which the reinforcing member and the inner panel overlap each other.

(5) In the aspect of (4), a portion of the reinforcing member corresponding to the upper portion of the opening flange may be formed to have a lower strength than a portion of the reinforcing member corresponding to the lower portion of the opening flange.

(6) In the aspect of any one of (1) to (5), the reinforcing member may be formed of an ultra-high-tensile steel plate having a tensile strength of 1500 MPa or more, and a portion of the reinforcing member provided with the mechanical coupling portion may be formed of a high-tensile steel plate having a tensile strength of 490 MPa or more and 1000 MPa or less.

(7) In the aspect of any one of (1) to (6), the opening flange may circle in an annular shape, and the mechanical coupling portions and the welded portions may be continuously provided in a circumferential direction of the opening flange.

(8) In the aspect of any one of (1) to (7), an electrical resistance of the side panel outer may be smaller than each of an electrical resistance of the reinforcing member and an electrical resistance of the inner panel, and a plate thickness of the side panel outer may be thinner than each of a plate thickness of the reinforcing member and a plate thickness of the inner panel.

(9) In the aspect of any one of (1) to (8), the mechanical coupling portion may have an adhesive between the side panel outer and the reinforcing member.

(10) According to another aspect of the present invention, there is provided a method of manufacturing a vehicle body lateral section structure, which is for manufacturing the vehicle body lateral section structure of any one of (1) to (9), the method including: a lateral section unit forming step of forming a vehicle body lateral section unit by coupling the side panel outer and the reinforcing member with each other through mechanical coupling; and a floor coupling step of coupling the inner panel to a floor, wherein the floor coupling step is provided on a main line for manufacturing a vehicle body by attaching a plurality of members with the floor, and wherein the lateral section unit forming step is provided on a sub line different from the main line.

(11) According to still another aspect of the present invention, there is provided a method of manufacturing a vehicle body lateral section structure, which is for manufacturing the vehicle body lateral section structure of any one of (1) to (9), the method including: a welding step of forming the welded portion by bringing a pair of welding tips into contact with both sides of the side panel outer and the inner panel for energizing, wherein, in the welding step, a contact area between the side panel outer and one of the welding tips is larger than a contact area between the inner panel and the other of the welding tips.

Advantageous Effects of Invention

According to the aspect of (1), the side panel outer and the reinforcing member are coupled with each other with the adhesive and the mechanical coupling portion, and the reinforcing member and the inner panel are coupled with each other with the welded portion. As a result, after the roof member such as the roof panel or the roof arch, which is a member on the vehicle body side, and the inner panel are coupled with each other, the roof side portion in which the side panel outer, the reinforcing member, and the inner panel overlap each other can be formed. Therefore, it is possible to couple the inner panel and the roof member with each other before the roof side portion having the closed cross section is formed as compared with the related art in which the inner panel and the roof member are coupled with each other after the roof side portion having the closed cross section is formed. Therefore, since the outside of the inner panel opens, a range accessible to a welding gun is widened, and the inner panel and the roof member can be reliably and firmly coupled with each other. Therefore, an attaching strength between the roof member and the inner panel is increased, and thus the rigidity of the vehicle body lateral section structure can be improved. Further, since the adhesive is interposed between the side panel outer made of an aluminum alloy and the reinforcing member made of steel, it is possible to curb the occurrence of electrolytic corrosion due to the contact between dissimilar metals. Therefore, the occurrence of rust due to the electrolytic corrosion in the side panel outer and the reinforcing member is curbed, and thus it is possible to further increase the rigidity of the roof side portion.

The mechanical coupling portions are provided at the interval of 40 mm or more and 80 mm or less in the longitudinal direction of the opening flange. As a result, it is possible to curb interference between the plurality of mechanical coupling portions and the welded portions provided between the plurality of mechanical coupling portions as compared with a case where the interval between the mechanical coupling portions is set to less than 40 mm. It is possible to curb the amount of separation of the side panel outer made of an aluminum alloy due to heating to be small as compared with a case where the interval between the mechanical coupling portions is larger than 80 mm. As a result, it is possible to curb a decrease in the torsional rigidity of the vehicle body due to an increase in the amount of separation. Therefore, it is possible to increase the rigidity of the entire vehicle body lateral section structure.

Therefore, it is possible to provide a vehicle body lateral section structure capable of improving the rigidity as compared with the related art in vehicle body weight reduction of a monocoque structure made of steel using aluminum.

According to the aspect of (2), the interval between the mechanical coupling portions is larger than the interval between the welded portions. As a result, the interval between the welded portions that couple the reinforcing member and the inner panel which are made of steel with each other can be made relatively small. Since the reinforcing member and the inner panel form a frame of the roof side portion, it is possible to increase the torsional rigidity of the roof side portion by reducing the interval between the welded portions that join the reinforcing member and the inner panel to each other. Therefore, it is possible to improve the rigidity of the entire vehicle body lateral section structure.

According to the aspect of (3), the welded portions are provided at the corner portion of the opening flange. A jig used for the welding has a smaller tip end than a jig for forming the mechanical coupling portion, and the coupling work can be performed even in a narrow region. Therefore, in a case where the welded portion is provided in the corner portion, the members can be reliably coupled with each other even in a narrow portion as compared with a case where the mechanical coupling portion is provided in the corner portion. Therefore, a coupling strength at the corner portion is improved, and thus the rigidity of the vehicle body lateral section structure can be improved.

According to the aspect of (4), the upper portion of the opening flange has a three-layer structure in which the side panel outer, the reinforcing member, and the inner panel overlap each other. Therefore, for example, by forming the roof panel and the side panel outer with a material made of an aluminum alloy, it is possible to reduce the weight of the vehicle body lateral section structure and to increase the heat strain absorption effect.

On the other hand, the lower portion of the opening flange has a two-layer structure in which the reinforcing member and the inner panel overlap each other. As a result, it is possible to reduce the weight of the lower portion of the opening flange, and it is possible to increase impact resistance performance by forming the lower portion with the reinforcing member and the inner panel which are made of steel. Therefore, it is possible to obtain a vehicle body lateral section structure that achieves both weight reduction and improvement in impact resistance performance.

According to the aspect of (5), a strength of a portion of the reinforcing member corresponding to the upper portion of the opening flange is lower than a strength of a portion of the reinforcing member corresponding to the lower portion of the opening flange. The reinforcing member positioned at the upper portion is formed to have a lower strength than the reinforcing member positioned at the lower portion because the reinforcing member positioned at the upper portion is formed to have a thinner plate thickness than the reinforcing member positioned at the lower portion, for example. By reducing the plate thickness of the reinforcing member positioned at the upper portion in this way, it is possible to reduce the weight of a portion of the reinforcing member corresponding to the upper portion of the opening flange. Similarly, the reinforcing member positioned at the upper portion may be formed of, for example, a fragile material having a smaller specific gravity than the reinforcing member positioned at the lower portion. By using the material having a smaller specific gravity as a material of the reinforcing member positioned at the upper portion, it is possible to further reduce the weight of a portion of the reinforcing member corresponding to the upper portion of the opening flange. The lower portion which is required to have higher impact resistance performance than the upper portion for an occupant to ride on is formed to have a higher strength than the upper portion. Therefore, it is possible to obtain a vehicle body lateral section structure in which the lower portion has high impact resistance performance and the weight of the upper portion is suitably reduced.

According to the aspect of (6), the reinforcing member is formed of an ultra-high-tensile steel plate having a tensile strength of 1500 MPa or more. As a result, a high strength can be maintained even in a case where the plate thickness of the reinforcing member is reduced. Therefore, it is possible to further reduce the weight by thinning the reinforcing member. A portion of the reinforcing member in which the mechanical coupling portion is provided becomes a high-tensile steel plate having a tensile strength of 490 MPa or more and 1000 MPa or less by being subjected to a softening treatment through, for example, annealing or the like. As a result, the formability of the material at the time of the mechanical coupling is improved, and thus the mechanical coupling portion can be easily formed. Since the softening treatment is applied only to the local region of the reinforcing member, it is possible to curb a decrease in the strength of the entire reinforcing member and maintain the rigidity of the opening flange in a high state. Therefore, it is possible to reduce the weight and improve the manufacturability without lowering the rigidity of the opening flange.

According to the aspect of (7), the mechanical coupling portions and the welded portions are provided in a circumferential direction of the opening flange. Thereby, the coupling strength at an edge portion of the opening flange can be improved. Therefore, the strength of the entire opening flange can be improved.

According to the aspect of (8), the side panel outer has a smaller electrical resistance and a thinner plate thickness than each of the reinforcing member and the inner panel. As a result, when welding is performed in a state where the side panel outer, the reinforcing member, and the inner panel overlap each other, welding can be performed between the reinforcing member and the inner panel having a larger resistance than the side panel outer. Therefore, the reinforcing member and the inner panel which are made of steel can be coupled to each other without providing a notch or a hole for welding in the side panel outer.

According to the aspect of (9), the mechanical coupling portion has the adhesive between the side panel outer made of an aluminum alloy and the reinforcing member made of steel. As a result, it is possible to curb the occurrence of electrolytic corrosion due to the contact between dissimilar metal materials such as aluminum and steel. Therefore, it is possible to curb the occurrence of rust in the side panel outer and the reinforcing member and to further increase the rigidity of the vehicle body lateral section structure.

According to the aspect of (10), the vehicle body lateral section structure is manufactured through the welding step, the lateral section unit forming step, and the floor coupling step. The floor coupling step is provided on the main line in a vehicle body manufacturing line, and the lateral section unit forming step is provided on the sub line in the vehicle body manufacturing line. Thereby, when the lateral section unit forming step is added, the lateral section unit forming step can be easily incorporated into the manufacturing line by adding the sub line without significantly changing the existing manufacturing equipment. Therefore, it is possible to obtain a highly versatile method of manufacturing the vehicle body lateral section structure by effectively utilizing the existing equipment.

Therefore, it is possible to provide a highly versatile method of manufacturing the vehicle body lateral section structure through which the vehicle body lateral section structure capable of improving the rigidity as compared with the related art in vehicle body weight reduction of a monocoque structure made of steel using aluminum can be easily manufactured.

According to the aspect of (11), the contact area between the side panel outer and one welding tip is larger than the contact area between the inner panel and the other welding tip. As a result, the amount of heat generated at the contact portion between the side panel outer and the welding tip when energized can be reduced. Therefore, the resistance welding is performed only between the reinforcing member and the inner panel which are made of steel, and the reinforcing member and the inner panel can be efficiently coupled with each other through the resistance welding. Since the aluminum alloy has a lower electrical resistance than the steel, it is possible to prevent the side panel outer and the reinforcing member from being welded to each other by reducing the amount of heat generated at the side panel outer. Therefore, it is possible to curb the occurrence of fragile intermetallic compounds due to welding of dissimilar metals between the aluminum alloy and the steel.

DESCRIPTION OF EMBODIMENTS

Hereinafter, embodiments of the present invention will be described with reference to the drawings. In the following description, an arrow FR in the figure indicates forward with respect to a vehicle body, an arrow UP in the figure indicates upward with respect to the vehicle body, and an arrow OUT in the figure indicates outward with respect to the vehicle body in a vehicle width direction.

(Vehicle Body Lateral Section Structure)

Figure 1:
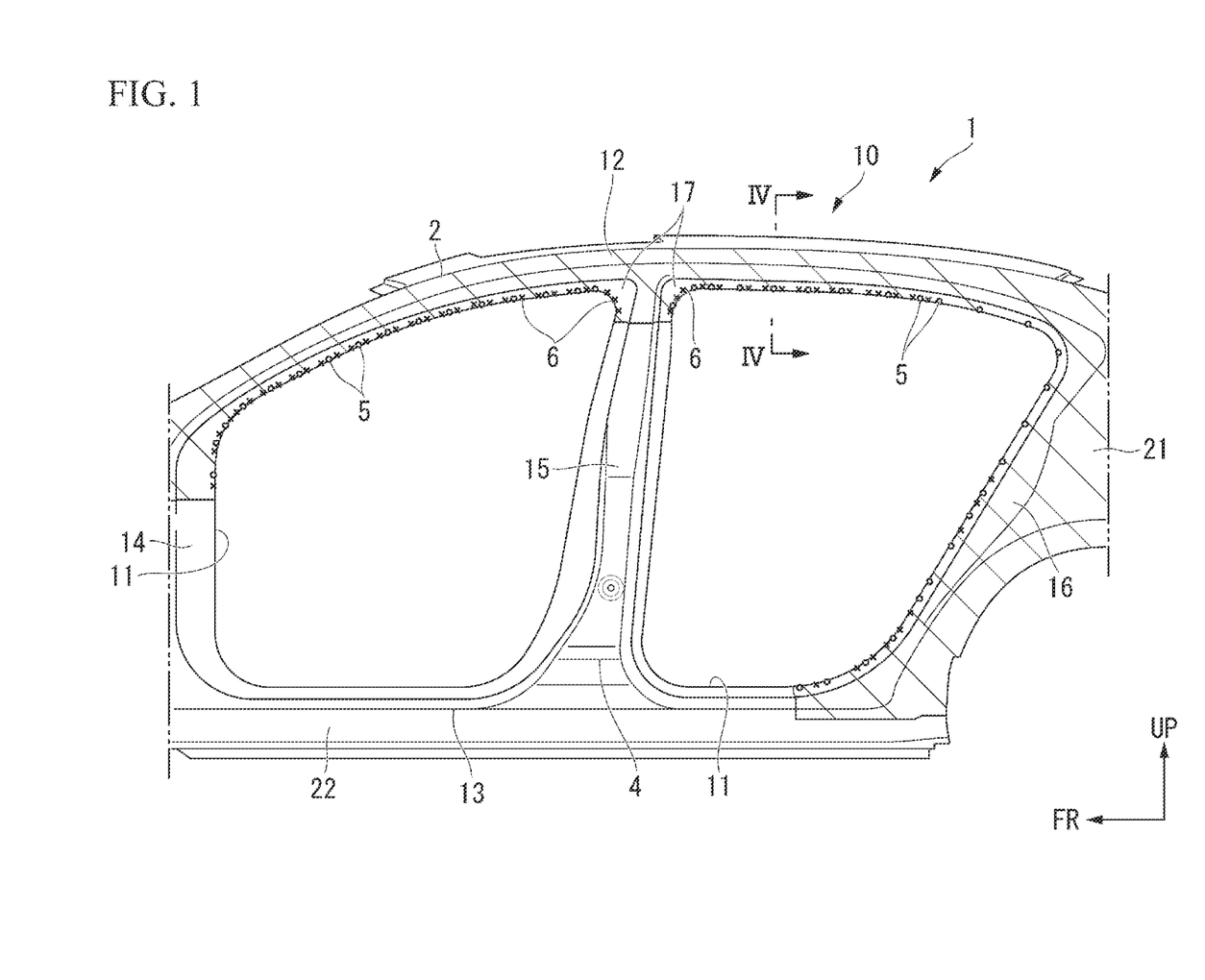
FIG. 1 is a front view of a vehicle body lateral section structure according to an embodiment.
Figure 2:
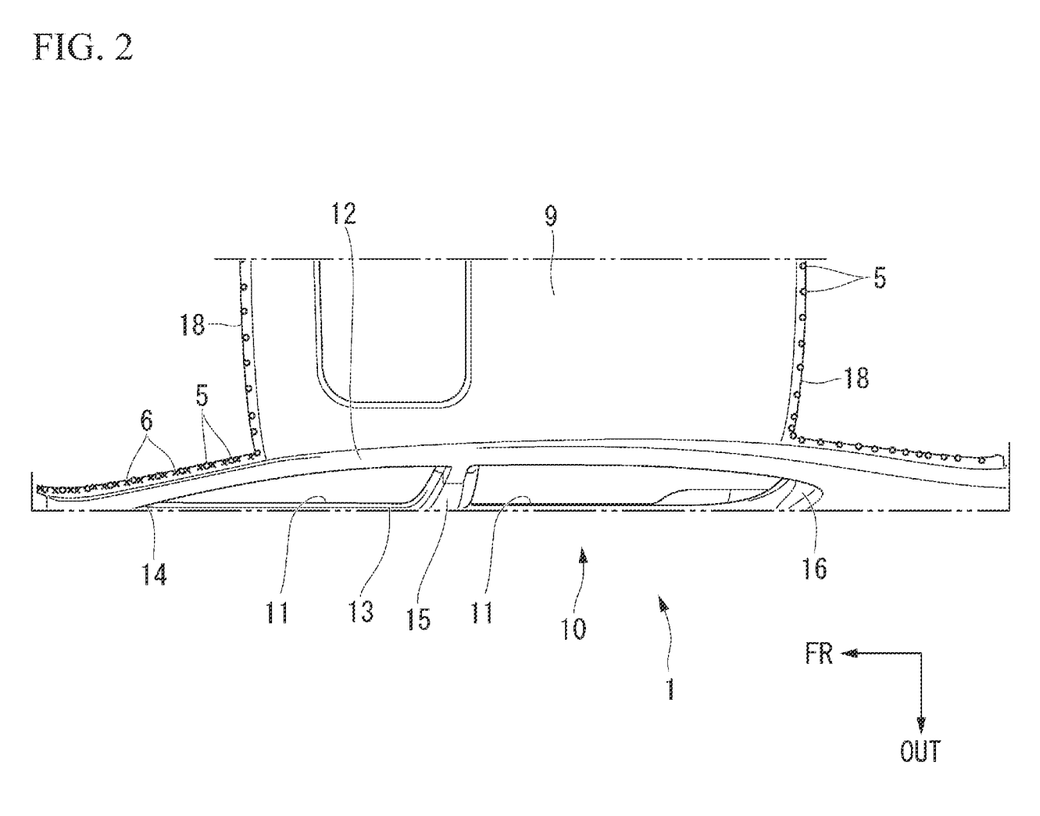
FIG. 2 is a top view of the vehicle body lateral section structure according to the embodiment.

FIG. 1 is a front view of a vehicle body lateral section structure 1 according to an embodiment. FIG. 2 is a top view of the vehicle body lateral section structure 1 according to the embodiment.

As shown in FIGS. 1 and 2, the vehicle body lateral section structure 1 includes an opening flange 10 that forms a plurality of door openings 11. A pair of left and right opening flanges 10 are provided on both lateral sections of the vehicle body. The vehicle body lateral section structure 1 has a front pillar 14, a center pillar 15, a rear pillar 16, a roof side portion 12, and a rocker portion 13.

The front pillar 14, the center pillar 15, and the rear pillar 16 are arranged in order from the front to the rear of the vehicle body. Each of the front pillar 14, the center pillar 15, and the rear pillar 16 extends in a vertical direction. A door opening 11 for a front door is provided between the front pillar 14 and the center pillar 15. A door opening 11 for a rear door is provided between the center pillar 15 and the rear pillar 16.

The roof side portion 12 forms an upper portion of the opening flange 10. An upper end portion of each of the front pillar 14, the center pillar 15, and the rear pillar 16 is connected to the roof side portion 12. The roof side portion 12 extends in a front-rear direction. The roof side portion 12 is connected to a roof panel 9 that covers an upper portion of the vehicle body.

The rocker portion 13 forms a lower portion of the opening flange 10. A lower end portion of each of the front pillar 14, the center pillar 15, and the rear pillar 16 is connected to the rocker portion 13. The rocker portion 13 extends in the front-rear direction.

In the vehicle body lateral section structure 1, an edge portion that circles in an annular shape along an edge portion of each door opening 11 is the opening flange 10. The vehicle body lateral section structure 1 includes a side panel outer 2, an inner panel 3 (see FIG. 3), a reinforcing member 4, a mechanical coupling portion 5 (see FIG. 6), and a resistance welded portion 6 (a welded portion in claims, see FIG. 6).

Figure 3:
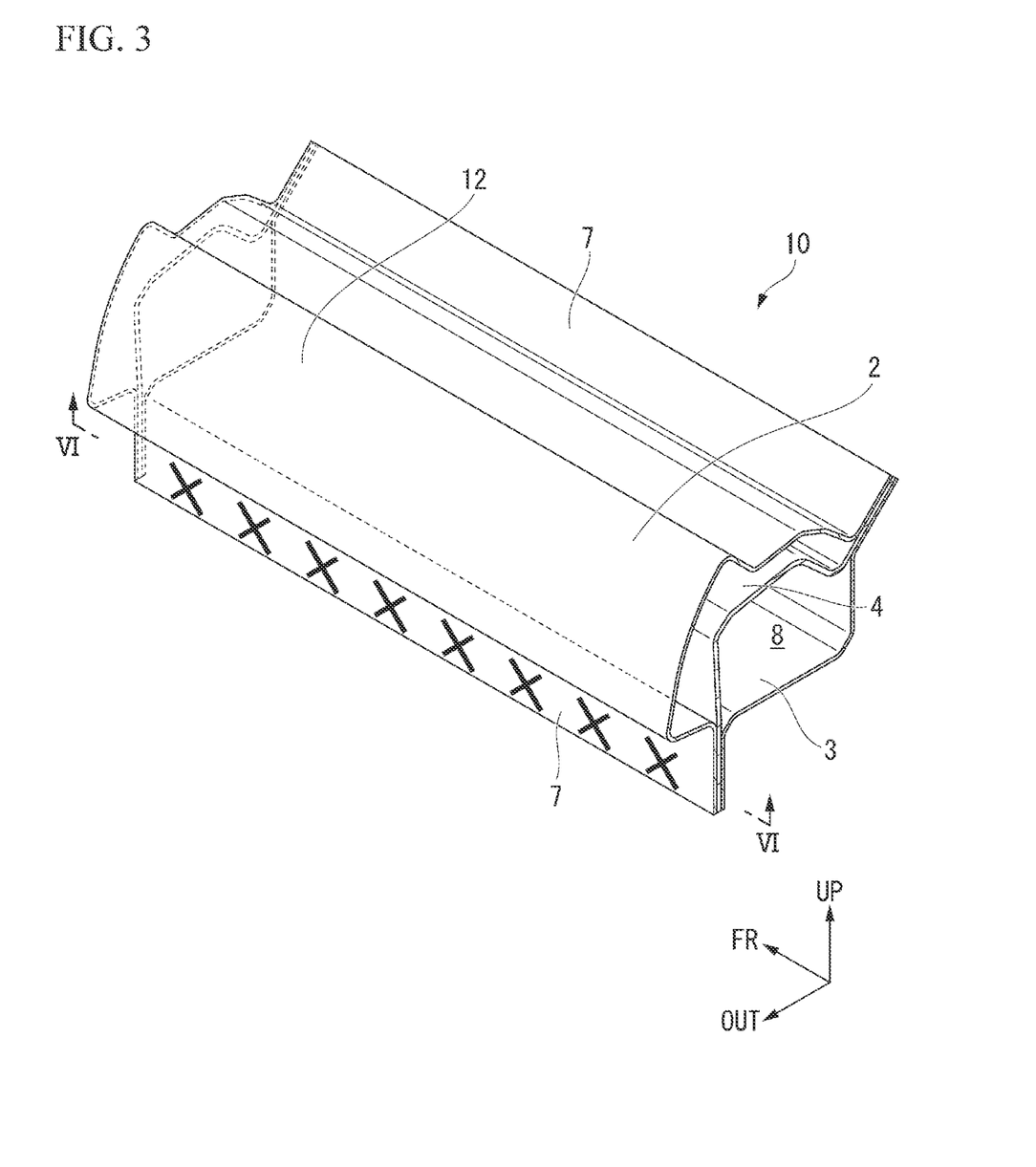
FIG. 3 is a cross-sectional perspective view of a roof side portion according to the embodiment.
Figure 4:
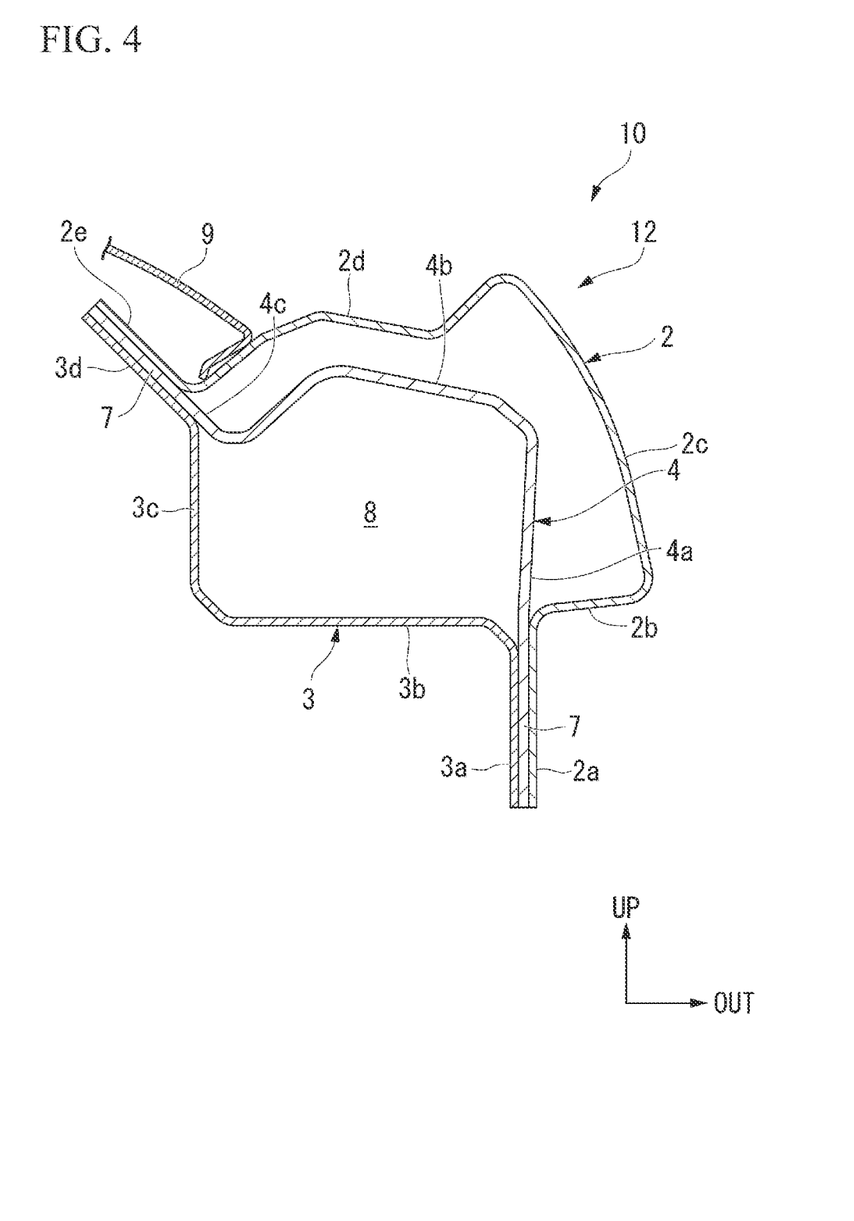
FIG. 4 is a cross-sectional view along line IV-IV of FIG. 1.

FIG. 3 is a cross-sectional perspective view of the roof side portion 12 according to the embodiment. FIG. 4 is a cross-sectional view along line IV-IV of FIG. 1.

As shown in FIGS. 1 and 3, the side panel outer 2 is provided in a first region 21 (see a hatched region shown in FIG. 1) extending from an upper portion of the opening flange 10 to a rear portion of the opening flange 10. The first region 21 is a region including the roof side portion 12, the rear pillar 16, and a rear end portion of the rocker portion 13 when viewed in the vehicle width direction. The side panel outer 2 is formed of an aluminum alloy. As shown in FIG. 3, the side panel outer 2 is disposed on the outermost side of the opening flange 10 in the vehicle width direction. In other words, the side panel outer 2 forms the opening flange 10. As shown in FIG. 4, in the roof side portion 12, the side panel outer 2 is formed in a shape of a hat in a cross section that is convex in a diagonal direction between outward in the vehicle width direction and upward. An inner end portion of the side panel outer 2 formed in a shape of a hat in a cross section in the vehicle width direction is connected to the roof panel 9.

Specifically, the side panel outer 2 forming the roof side portion 12 has an outer outward flange 2a, an outer lower wall portion 2b, an outer top wall portion 2c, an outer upper wall portion 2d, and an outer inward flange 2e. The outer outward flange 2a extends in the vertical direction. The outer lower wall portion 2b is bent from an upper end portion of the outer outward flange 2a and extends outward in the vehicle width direction. The outer top wall portion 2c is bent from an outer end portion of the outer lower wall portion 2b in the vehicle width direction and extends upward and inward in the vehicle width direction and is gently curved to be convex outward in the vehicle width direction. The outer upper wall portion 2d is bent from an upper end portion of the outer top wall portion 2c and extends inward in the vehicle width direction. The roof panel 9 is connected to an inner end portion of the outer upper wall portion 2d in the vehicle width direction. The outer inward flange 2e is bent from the inner end portion of the outer upper wall portion 2d in the vehicle width direction and extends upward.

The inner panel 3 is provided inside the side panel outer 2 in the vehicle width direction. The inner panel 3 is formed of a steel material. The inner panel 3 is formed by bending a steel plate. Specifically, the inner panel 3 has an inner outward flange 3a, an inner horizontal wall portion 3b, an inner vertical wall portion 3c, and an inner inward flange 3d. The inner outward flange 3a extends in the vertical direction. The inner outward flange 3a is coupled with the outer outward flange 2a at a coupling portion 7. The inner horizontal wall portion 3b is bent from an upper end portion of the inner outward flange 3a and extends inward in the vehicle width direction. The inner vertical wall portion 3c is bent from an inner end portion of the inner horizontal wall portion 3b in the vehicle width direction and extends upward. The inner inward flange 3d is bent from an upper end portion of the inner vertical wall portion 3c and extends inward in the vehicle width direction. The inner inward flange 3d is coupled with the outer inward flange 2e at the coupling portion 7. As a result, the inner panel 3 covers an opening of the side panel outer 2 formed in a shape of a hat in a cross section.

The reinforcing member 4 is provided between the side panel outer 2 and the inner panel 3 in the vehicle width direction. In other words, the reinforcing member 4 overlaps inside the side panel outer 2 in the vehicle width direction. The inner panel 3 overlaps inside the reinforcing member 4 in the vehicle width direction. The reinforcing member 4 is formed of a steel material. The reinforcing member 4 is formed of an ultra-high-tensile steel plate having a tensile strength of 1500 MPa or more. In the roof side portion 12, the reinforcing member 4 is formed in a shape of a hat in a cross section that is convex in the diagonal direction between outward in the vehicle width direction and upward.

Specifically, the reinforcing member 4 forming the roof side portion 12 has a first flange 4a, a bulging portion 4b, and a second flange 4c. The first flange 4a extends in the vertical direction. The first flange 4a is coupled with the outer outward flange 2a and the inner outward flange 3a at the coupling portion 7 in a state of being sandwiched between the outer outward flange 2a and the inner outward flange 3a. The bulging portion 4b is bent from an upper end portion of the first flange 4a, extends inward in the vehicle width direction, and bulges to be convex in the diagonal direction between outward in the vehicle width direction and upward. The second flange 4c is bent from an inner end portion of the bulging portion 4b in the vehicle width direction and extends inward in the vehicle width direction. The second flange 4c is coupled with the outer inward flange 2e and the inner inward flange 3d at the coupling portion 7 in a state of being sandwiched between the outer inward flange 2e and the inner inward flange 3d.

Therefore, at the coupling portion 7, the inner panel 3, the reinforcing member 4, and a side panel outer 2 overlap each other in three layers in this order from the inside to the outside. A closed cross section 8 is formed between the reinforcing member 4 and the inner panel 3 by covering an opening of the reinforcing member 4 with the inner panel 3 in a state where the members overlap each other in three layers and are coupled with each other.

Figure 5:
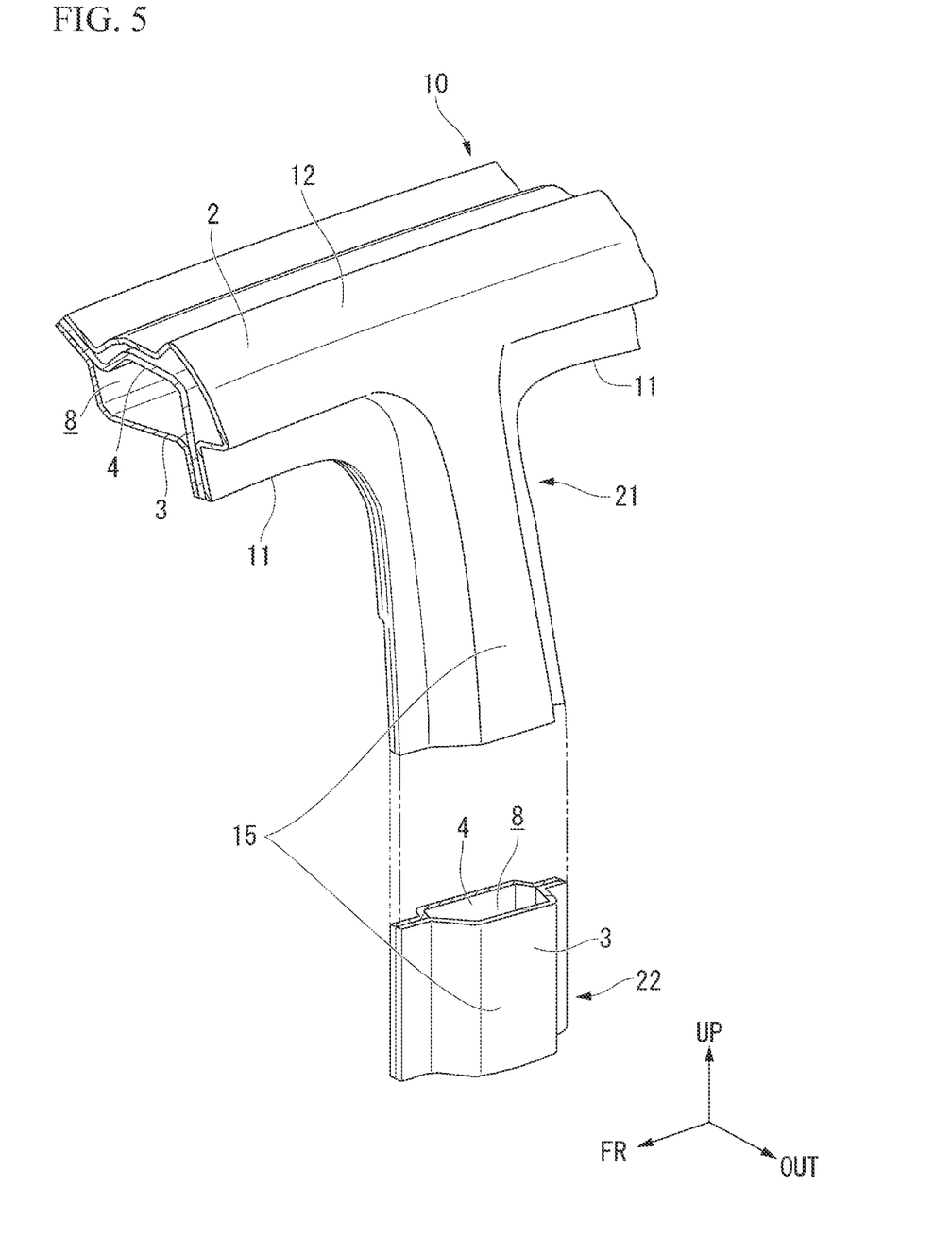
FIG. 5 is a cross-sectional perspective view of a center pillar according to the embodiment.

FIG. 5 is a cross-sectional perspective view of the center pillar 15 according to the embodiment.

As shown in FIGS. 1 and 5, the inner panel 3 and the reinforcing member 4 are provided in the entire region including the first region 21 of the opening flange 10 and a second region 22 other than the first region 21. The second region 22 is a region including the front pillar 14, the center pillar 15, and the rocker portion 13. In other words, the second region 22 is a region of the entire opening flange 10 in which the side panel outer 2 is not provided when viewed in the vehicle width direction.

As shown in FIG. 5, the first region 21 (that is, the upper portion of the opening flange 10) has a three-layer structure in which the side panel outer 2, the reinforcing member 4, and the inner panel 3 overlap each other. The second region 22 (that is, the lower portion of the opening flange 10) has a two-layer structure in which the reinforcing member 4 and the inner panel 3 overlap each other.

In the second region 22 in which the center pillar 15 and the like are positioned, the inner panel 3 is formed in the shape of a hat in a cross section that is convex inward in the vehicle width direction. In the second region 22, the reinforcing member 4 is formed in the shape of a hat in a cross section that is convex outward in the vehicle width direction. The inner panel 3 and the reinforcing member 4 form the closed cross section 8 by disposing the openings facing each other.

A strength of a portion of the reinforcing member 4 corresponding to the first region 21 is formed to be lower than a strength of a portion of the reinforcing member 4 corresponding to the second region 22. In the present embodiment, a plate thickness of the reinforcing member 4 provided in the first region 21 is formed to be thinner than a plate thickness of the reinforcing member 4 provided in the second region 22. As a result, the strength of the reinforcing member 4 in the first region 21 is lower than that in the second region 22.

The means for reducing the strength of the reinforcing member 4 in the first region 21 as compared with that in the second region 22 is not limited to the means for changing the plate thickness as described above. For example, the strength of the reinforcing member 4 in the first region 21 may be reduced using a fragile material having a smaller specific gravity than the reinforcing member 4 in the second region 22. The strength may be reduced by forming a notch or the like in the reinforcing member 4 of the first region 21. These means may be used together.

Figure 6:
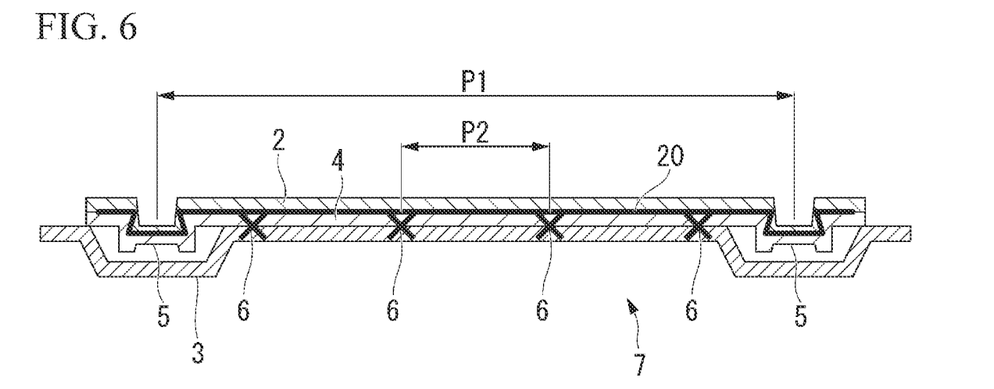
FIG. 6 is a cross-sectional view along line VI-VI of FIG. 3.

FIG. 6 is a cross-sectional view along line VI-VI of FIG. 3.

In the coupling portion 7, the side panel outer 2, the inner panel 3, and the reinforcing member 4 are coupled with each other using the mechanical coupling portion 5 and the resistance welded portion 6 in combination.

The mechanical coupling portion 5 mechanically couples the side panel outer 2 and the reinforcing member 4 with each other by plastically deforming the side panel outer 2 and the reinforcing member 4 by clinching. As shown in FIG. 1, a plurality of mechanical coupling portions 5 are provided along a peripheral edge portion of the door opening 11 in the opening flange 10. In other words, the mechanical coupling portions 5 are provided in a circumferential direction of the opening flange 10. As shown in FIG. 2, the mechanical coupling portions 5 are similarly provided at an edge portion of a window hole 18 in the roof panel 9. As shown in FIG. 6, an adhesive 20 is applied between the side panel outer 2 and the reinforcing member 4. The plurality of mechanical coupling portions 5 are provided at a predetermined interval P1 in a longitudinal direction (the circumferential direction) of the opening flange 10 in a state where the side panel outer 2 and the reinforcing member 4 are adhered to each other with the adhesive 20. That is, the mechanical coupling portion 5 contains the adhesive 20. The predetermined interval P1 between the mechanical coupling portions 5 is set to a value at which the side panel outer 2 made of an aluminum alloy is not separated from the reinforcing member 4 made of steel during heating. In the present embodiment, the predetermined interval P1 in the mechanical coupling portion 5 is 40 mm or more and 80 mm or less.

Figure 7:
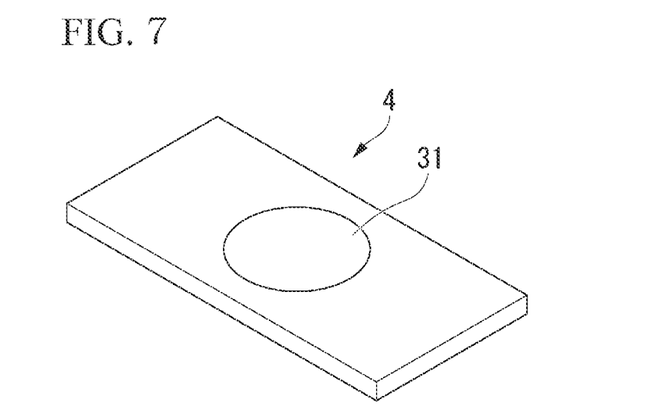
FIG. 7 is a perspective view of a reinforcing member in which a mechanical coupling portion according to the embodiment is formed.

FIG. 7 is a perspective view of the reinforcing member 4 in which the mechanical coupling portion 5 according to the embodiment is formed.

A portion of the reinforcing member 4 in which the mechanical coupling portion 5 is formed is a softened portion 31. The softened portion 31 is formed of an ultra-high-tensile steel plate having a tensile strength of 490 MPa or more and 1000 MPa or less. The softened portion 31 is locally formed in a part of the reinforcing member 4, for example, by subjecting a base material to a softening treatment such as annealing. The softened portion 31 is formed in a circular shape when viewed in a plate thickness direction of the reinforcing member 4.

Figure 8:
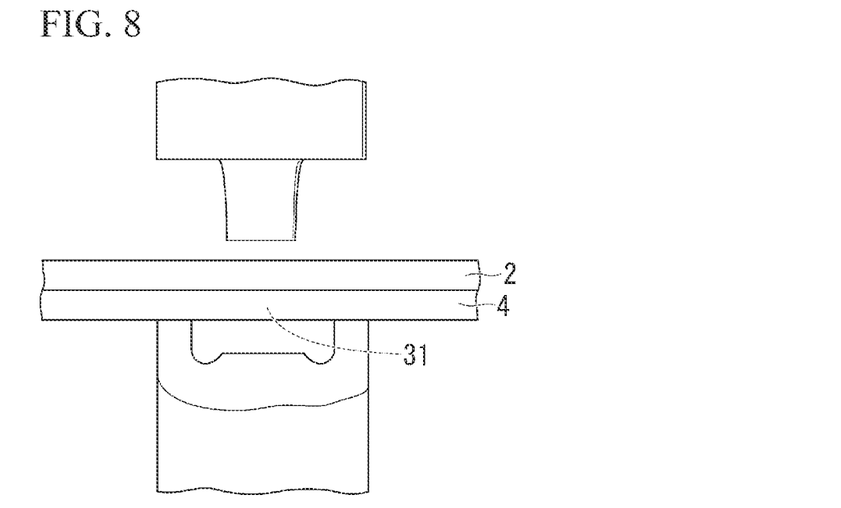
FIG. 8 is an explanatory view showing a clinching step according to the embodiment.

FIG. 8 is an explanatory view showing a clinching step according to the embodiment.

As shown in FIG. 8, the mechanical coupling portion 5 is formed by performing clinching in a state where the side panel outer 2 and the softened portion 31 of the reinforcing member 4 overlap each other. When the clinching is performed, the reinforcing member 4 which has been heated in advance is used. The mechanical coupling portion 5 is formed by plastically deforming the side panel outer 2 and the reinforcing member 4 in a state where the softened portion 31 is locally formed by heating.

The mechanical coupling portion 5 may be formed by rivet processing instead of clinching.

As shown in FIG. 6, the resistance welded portion 6 is provided between the adjacent mechanical coupling portions 5. The resistance welded portion 6 joins the reinforcing member 4 and the inner panel 3 to each other through resistance welding in a state where the side panel outer 2, the reinforcing member 4, and the inner panel 3 overlap each other in three layers. In the resistance welded portion 6, an electrical resistance of the side panel outer 2 is smaller than each of an electrical resistance of the reinforcing member 4 and an electrical resistance of the inner panel 3. In the resistance welded portion 6, a plate thickness of the side panel outer 2 is thinner than each of a plate thickness of the reinforcing member 4 and a plate thickness of the inner panel 3. In the present embodiment, the plate thickness of the side panel outer 2 is t1.0. The plate thickness of each of the reinforcing member 4 and the inner panel 3 is t1.6. As a result, the amount of heat generated between the reinforcing member 4 and the inner panel 3 which are made of steel having a larger electrical resistance than that of the aluminum alloy becomes larger. Therefore, the resistance welded portion 6 is formed only between the reinforcing member 4 and the inner panel 3.

As shown FIG. 1, the resistance welded portions 6 are provided in a circumferential direction of the opening flange 10. The mechanical coupling portions 5 and the welded portions are provided in a circumferential direction of the opening flange 10. The resistance welded portions 6 are provided at a corner portion 17 of the opening flange 10 corresponding to a corner portion of the door opening 11.

As shown FIG. 6, a plurality of the resistance welded portions 6 are provided at a predetermined interval P2 in the longitudinal direction (the circumferential direction) of the opening flange 10. The interval P2 between the resistance welded portions 6 is smaller than the interval P1 between the mechanical coupling portions 5.

(Method of Manufacturing Vehicle Body Lateral Section Structure)

Next, a method of manufacturing the vehicle body lateral section structure 1, which is for manufacturing the vehicle body lateral section structure 1 described above, will be described.

Figure 9:
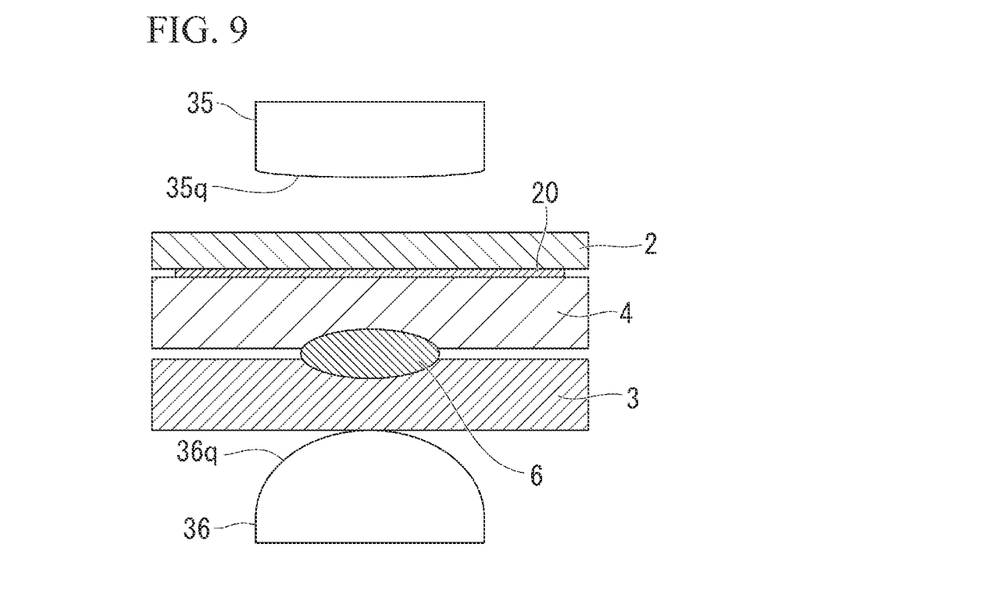
FIG. 9 is an explanatory view showing a welding step according to the embodiment.
Figure 10:
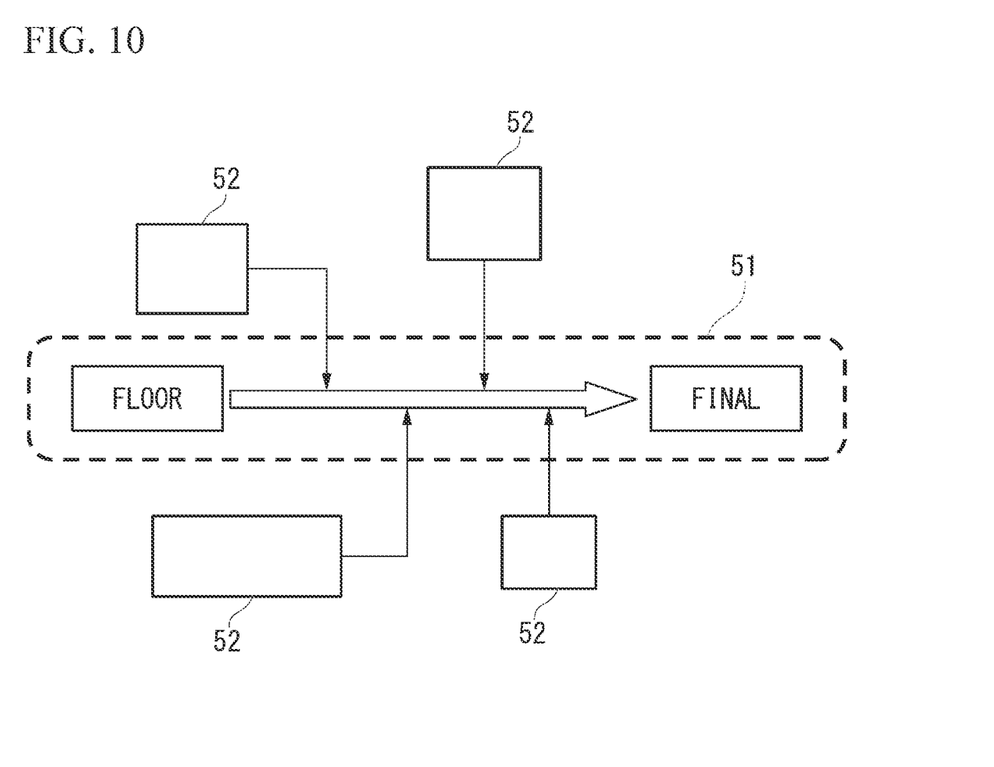
FIG. 10 is an explanatory diagram showing a method of manufacturing a vehicle body lateral section structure according to the embodiment.

FIG. 9 is an explanatory view showing a welding step according to the embodiment. FIG. 10 is an explanatory diagram showing the method of manufacturing the vehicle body lateral section structure 1 according to the embodiment.

The method of manufacturing the vehicle body lateral section structure 1 includes a welding step, a lateral section unit forming step, and a floor coupling step.

First, the welding step will be described. As shown in FIG. 9, in the welding step, the resistance welded portion 6 is formed by bringing a pair of welding tips 35 and 36 into contact with both sides of the side panel outer 2 and the inner panel 3 to perform energizing.

In the welding step, in a state where three side panel outer 2, the reinforcing member 4, and the inner panel 3 are overlap each other in three layer in this order, the pair of welding tips 35 and 36 are disposed to come into contact with the side panel outers 2 and the inner panel 3 at both sides in the plate thickness direction. A surface of each of the welding tips 35 and 36 that come into contact with the side panel outer 2 or the inner panel 3 is formed in a spherical shape having a predetermined radius. A contact area between the welding tip 35 positioned on a side of the side panel outer 2 and the side panel outer 2 is larger than a contact area between the welding tip 36 positioned on a side of the inner panel 3 and the inner panel 3. Specifically, a radius of a spherical portion 35q formed on the surface of the welding tip 35 on a side of the side panel outer 2 is larger than a radius of a spherical portion 36q formed on the surface of the welding tip 36 on a side of the inner panel 3. That is, the surface of the welding tip 35 on a side of the side panel outer 2 has a gentler curvature than the surface of the welding tip 36 on a side of the inner panel 3.

Next, while the side panel outer 2, the reinforcing member 4, and the inner panel 3 are pressed in the plate thickness direction, a predetermined voltage is applied between the welding tips 35 and 36 on both sides to perform energizing. When energizing is performed, the side panel outer 2 and the reinforcing member 4 do not melt between the side panel outer 2 and the reinforcing member 4 having a small electrical resistance and a small heat generation amount. Therefore, resistance welding is not performed between the side panel outer 2 and the reinforcing member 4. On the other hand, resistance welding is performed between the reinforcing member 4 and the inner panel 3 having a large electrical resistance and a large heat generation amount as compared with between the side panel outer 2 and the reinforcing member 4. As a result, even when the three members overlap each other to perform energizing, only the reinforcing member 4 and the inner panel 3 are coupled with each other through the resistance welding. Although the resistance welding of the present embodiment is spot welding, seam welding may be performed between the mechanical coupling portions 5, for example.

It is desirable that the welding step be performed after a step of coupling the inner panel 3 and a roof member such as the roof panel 9 or a roof arch (not shown) with each other. That is, it is desirable that the inner panel 3 and the roof member are coupled with each other before the closed cross section 8 is formed by the inner panel 3, the reinforcing member 4, and the side panel outer 2. In this case, when the inner panel 3 and the roof member are coupled with each other, the inner panel 3 and the roof member can be coupled with each other at both sides in the plate thickness direction, and thus a fixing strength of the inner panel 3 is increased.

Next, the lateral section unit forming step and the floor coupling step will be described.

In the lateral section unit forming step, a vehicle body lateral section unit is formed by coupling the side panel outer 2 and the reinforcing member 4 with each other through mechanical coupling. The vehicle body lateral section unit is in a state before the inner panel 3 is included in the vehicle body lateral section structure 1 described above, for example.

In the floor coupling step, the inner panel 3 is coupled with a floor after the lateral section unit forming step.

Through the lateral section unit forming step and the floor coupling step in this way, the vehicle body lateral section structure 1 is manufactured.

As shown in FIG. 10, the floor coupling step is provided on a main line 51 for manufacturing a vehicle body having the vehicle body lateral section structure 1 by attaching a plurality of members with the floor as a reference. The lateral section unit forming step is provided on a sub line 52 different from the main line 51.

(Operations and Effects)

Next, operations and effects of the vehicle body lateral section structure 1 and the method of manufacturing the vehicle body lateral section structure 1 described above will be described.

According to the vehicle body lateral section structure 1 of the present embodiment, the side panel outer 2 and the reinforcing member 4 are coupled with each other with the adhesive 20 and the mechanical coupling portion 5, and the reinforcing member 4 and the inner panel 3 are coupled with each other with the resistance welded portion 6. As a result, after the roof member such as the roof panel 9 or the roof arch, which is a member on the vehicle body side, and the inner panel 3 are coupled with each other, the roof side portion 12 in which the side panel outer 2, the reinforcing member 4, and the inner panel 3 overlap each other can be formed. Therefore, it is possible to couple the inner panel 3 and the roof member with each other before the roof side portion 12 having the closed cross section 8 is formed as compared with the related art in which the inner panel 3 and the roof member are coupled with each other after the roof side portion 12 having the closed cross section 8 is formed. Therefore, since the outside of the inner panel 3 opens, a range accessible to a welding gun is widened, and the inner panel 3 and the roof member can be reliably and firmly coupled with each other. Therefore, an attaching strength between the roof member and the inner panel 3 is increased, and thus the rigidity of the vehicle body lateral section structure 1 can be improved. Further, since the adhesive 20 is interposed between the side panel outer 2 made of an aluminum alloy and the reinforcing member 4 made of steel, it is possible to curb the occurrence of electrolytic corrosion due to the contact between dissimilar metals. Therefore, the occurrence of rust due to the electrolytic corrosion in the side panel outer 2 and the reinforcing member 4 is curbed, and thus it is possible to further increase the rigidity of the roof side portion 12. The mechanical coupling portions 5 are provided at the interval P1 of 40 mm or more and 80 mm or less in the longitudinal direction of the opening flange 10. As a result, it is possible to curb interference between the plurality of mechanical coupling portions 5 and the resistance welded portions 6 provided between the plurality of mechanical coupling portions 5 as compared with a case where the interval P1 between the mechanical coupling portions 5 is set to less than 40 mm. It is possible to curb the amount of separation of the side panel outer 2 made of an aluminum alloy due to heating to be small as compared with a case where the interval P1 between the mechanical coupling portions 5 is larger than 80 mm. As a result, it is possible to curb a decrease in the torsional rigidity of the vehicle body due to an increase in the amount of separation. Therefore, it is possible to increase the rigidity of the entire vehicle body lateral section structure 1.

Therefore, it is possible to provide a vehicle body lateral section structure 1 capable of improving the rigidity as compared with the related art in vehicle body weight reduction of a monocoque structure made of steel using aluminum.

The interval P1 between the mechanical coupling portions 5 is larger than the interval P2 between the resistance welded portions 6. As a result, the interval P2 between the resistance welded portions 6 that couple the reinforcing member 4 and the inner panel 3 which are made of steel with each other can be made relatively small. Since the reinforcing member 4 and the inner panel 3 form a frame of the roof side portion 12, it is possible to increase the torsional rigidity of the roof side portion 12 by reducing the interval P2 between the resistance welded portions 6 that join the reinforcing member 4 and the inner panel 3 to each other. Therefore, it is possible to improve the rigidity of the entire vehicle body lateral section structure 1.

The resistance welded portions 6 are provided at the corner portion 17 of the opening flange 10. A jig used for the resistance welding has a smaller tip end than a jig for forming the mechanical coupling portion 5, and the coupling work can be performed even in a narrow region. Therefore, in a case where the resistance welded portion 6 is provided in the corner portion 17, the members can be reliably coupled with each other even in a narrow portion as compared with a case where the mechanical coupling portion 5 is provided in the corner portion 17. Therefore, a coupling strength at the corner portion 17 is improved, and thus the rigidity of the vehicle body lateral section structure 1 can be improved.

The upper portion of the opening flange 10 has a three-layer structure in which the side panel outer 2, the reinforcing member 4, and the inner panel 3 overlap each other. Therefore, for example, by forming the roof panel and the side panel outer 2 with a material made of an aluminum alloy, it is possible to reduce the weight of the vehicle body lateral section structure 1 and to increase the heat strain absorption effect.

On the other hand, the lower portion of the opening flange 10 has a two-layer structure in which the reinforcing member 4 and the inner panel 3 overlap each other. As a result, it is possible to reduce the weight of the lower portion of the opening flange 10, and it is possible to increase impact resistance performance by forming the lower portion with the reinforcing member 4 and the inner panel 3 which are made of steel. Therefore, it is possible to obtain a vehicle body lateral section structure 1 that achieves both weight reduction and improvement in impact resistance performance.

A strength of a portion of the reinforcing member 4 corresponding to the upper portion of the opening flange 10 is lower than a strength of a portion of the reinforcing member 4 corresponding to the lower portion of the opening flange 10. The reinforcing member 4 positioned at the upper portion is formed to have a lower strength than the reinforcing member 4 positioned at the lower portion because the reinforcing member 4 positioned at the upper portion is formed to have a thinner plate thickness than the reinforcing member 4 positioned at the lower portion, for example. By reducing the plate thickness of the reinforcing member 4 positioned at the upper portion in this way, it is possible to reduce the weight of a portion of the reinforcing member 4 corresponding to the upper portion of the opening flange 10. Similarly, the reinforcing member 4 positioned at the upper portion may be formed of, for example, a fragile material having a smaller specific gravity than the reinforcing member 4 positioned at the lower portion. By using the material having a smaller specific gravity as a material of the reinforcing member 4 positioned at the upper portion, it is possible to further reduce the weight of a portion of the reinforcing member 4 corresponding to the upper portion of the opening flange 10. The lower portion which is required to have higher impact resistance performance than the upper portion for an occupant to ride on is formed to have a higher strength than the upper portion. Therefore, it is possible to obtain a vehicle body lateral section structure 1 in which the lower portion has high impact resistance performance and the weight of the upper portion is suitably reduced.

The reinforcing member 4 is formed of an ultra-high-tensile steel plate having a tensile strength of 1500 MPa or more. As a result, a high strength can be maintained even in a case where the plate thickness of the reinforcing member 4 is reduced. Therefore, it is possible to further reduce the weight by thinning the reinforcing member 4. A portion of the reinforcing member 4 in which the mechanical coupling portion 5 is provided (the softened portion 31) becomes a high-tensile steel plate having a tensile strength of 490 MPa or more and 1000 MPa or less by being subjected to a softening treatment through, for example, annealing or the like. As a result, the formability of the material at the time of the mechanical coupling is improved, and thus the mechanical coupling portion 5 can be easily formed. Since the softening treatment is applied only to the local region of the reinforcing member 4, it is possible to curb a decrease in the strength of the entire reinforcing member 4 and maintain the rigidity of the opening flange 10 in a high state. Therefore, it is possible to reduce the weight and improve the manufacturability without lowering the rigidity of the opening flange 10.

The mechanical coupling portions 5 and the resistance welded portions 6 are provided in a circumferential direction of the opening flange 10. Thereby, the coupling strength at an edge portion of the opening flange 10 can be improved. Therefore, the strength of the entire opening flange 10 can be improved.

The side panel outer 2 has a smaller electrical resistance and a thinner plate thickness than each of the reinforcing member 4 and the inner panel 3. As a result, when welding is performed in a state where the side panel outer 2, the reinforcing member 4, and the inner panel 3 overlap each other, welding can be performed between the reinforcing member 4 and the inner panel 3 having a larger resistance than the side panel outer 2. Therefore, the reinforcing member 4 and the inner panel 3 which are made of steel can be coupled to each other without providing a notch or a hole for welding in the side panel outer 2.

The mechanical coupling portion 5 has the adhesive 20 between the side panel outer 2 made of an aluminum alloy and the reinforcing member 4 made of steel. As a result, it is possible to curb the occurrence of electrolytic corrosion due to the contact between dissimilar metal materials such as aluminum and steel. Therefore, it is possible to curb the occurrence of rust in the side panel outer 2 and the reinforcing member 4 and to further increase the rigidity of the vehicle body lateral section structure 1.

According to the method of manufacturing the vehicle body lateral section structure 1 of the present embodiment, the vehicle body lateral section structure 1 is manufactured through the welding step, the lateral section unit forming step, and the floor coupling step. The floor coupling step is provided on the main line 51 in a vehicle body manufacturing line, and the lateral section unit forming step is provided on the sub line 52 in the vehicle body manufacturing line. Thereby, when the lateral section unit forming step is added, the lateral section unit forming step can be easily incorporated into the manufacturing line by adding the sub line 52 without significantly changing the existing manufacturing equipment. Therefore, it is possible to obtain a highly versatile method of manufacturing the vehicle body lateral section structure 1 by effectively utilizing the existing equipment.

Therefore, it is possible to provide a highly versatile method of manufacturing the vehicle body lateral section structure 1 through which the vehicle body lateral section structure 1 capable of improving the rigidity as compared with the related art in vehicle body weight reduction of a monocoque structure made of steel using aluminum can be easily manufactured.

In the welding step, the contact area between the side panel outer 2 and one welding tip 35 is larger than the contact area between the inner panel 3 and the other welding tip 36. As a result, the amount of heat generated at the contact portion between the side panel outer 2 and the welding tip 35 when energized can be reduced. Therefore, the resistance welding is performed only between the reinforcing member 4 and the inner panel 3 which are made of steel, and the reinforcing member 4 and the inner panel 3 can be efficiently coupled with each other through the resistance welding. Since the aluminum alloy has a lower electrical resistance than the steel, it is possible to prevent the side panel outer 2 and the reinforcing member 4 from being welded to each other by reducing the amount of heat generated at the side panel outer 2. Therefore, it is possible to curb the occurrence of fragile intermetallic compounds due to welding of dissimilar metals between the aluminum alloy and the steel.

The technical scope of the present invention is not limited to the above-described embodiments, and various modifications can be made without departing from the spirit of the present invention.

In the above-described embodiment and the example shown in FIG. 1, a configuration in which the mechanical coupling portion 5 and the resistance welded portion 6 are formed in a portion of the peripheral edge portion of the door opening 11 of the opening flange 10 corresponding to the first region 21 has been described, but the present invention is not limited to this. The mechanical coupling portion 5, the resistance welded portion 6, and the like may be formed in a portion of the peripheral edge portion of the door opening 11 of the opening flange 10 corresponding to the second region 22. An adhesive coupling portion with the adhesive 20 may be provided in combination with these coupling portions 7.

In the above-described embodiment, a configuration in which the side panel outer 2 provided with the resistance welded portion 6 is formed of a material having a smaller electrical resistance and has a thinner plate thickness than each of the reinforcing member 4 and the inner panel 3 has been described, but the present invention is not limited to this. In the side panel outer 2, the electrical resistance between the side panel and the reinforcing member 4 at the time of resistance welding only has to be smaller as a whole than the electrical resistance between the reinforcing member 4 and the inner panel 3. That is, for example, even in a case where the plate thickness is the same, the electrical resistance of the side panel outer 2 may be reduced by forming the side panel outer 2 with a material having a smaller electrical resistance than each of the reinforcing member 4 and the inner panel 3. However, the configuration of the present embodiment in which the side panel outer 2 that is formed of a material having a small electrical resistance and has a thinner plate thickness is used has an advantage in that it is possible to efficiently weld the reinforcing member 4 and the inner panel 3 to each other by curbing the heat generation amount of the side panel outer 2.

The cross-sectional shapes of the side panel outer 2, the inner panel 3, and the reinforcing member 4 in the roof side portion 12 are not limited to the shapes of the above-described embodiment as long as the closed cross section 8 can be formed.

In addition, it is possible to appropriately replace the constituent elements in the above-described embodiments with well-known constituent elements without departing from the spirit of the present invention, and the above-described embodiments may be combined as appropriate.

REFERENCE SIGNS LIST

1 Vehicle body lateral section structure
2 Side panel outer
3 Inner panel
4 Reinforcing member
5 Mechanical coupling portion
6 Resistance welded portion (welded portion)
10 Opening flange
11 Door opening
17 Corner portion
20 Adhesive
35, 36 Welding tip
51 Main line
52 Sub line
P1 Interval between mechanical coupling portions
P2 Interval between resistance welded portions

The invention claimed is:

1. A vehicle body lateral section structure comprising:
a side panel outer that is made of an aluminum alloy and forms an opening flange having a door opening of a vehicle body;
a reinforcing member that is made of steel and overlaps inside the side panel outer in a vehicle width direction of the vehicle body;
an inner panel that is made of steel and overlaps inside the reinforcing member in the vehicle width direction;
a plurality of mechanical coupling portions that are provided at an interval of 40 mm or more and 80 mm or less in a longitudinal direction of the opening flange in a state where the side panel outer and the reinforcing member are adhered to each other with an adhesive to couple the side panel outer and the reinforcing member with each other through mechanical coupling; and
welded portions that are provided between the plurality of mechanical coupling portions in the longitudinal direction to join the reinforcing member and the inner panel to each other in a state where the side panel outer, the reinforcing member, and the inner panel overlap each other in three layers.

2. The vehicle body lateral section structure according to claim 1, wherein the interval between the mechanical coupling portions in the longitudinal direction is larger than an interval between the welded portions in the longitudinal direction.

3. The vehicle body lateral section structure according to claim 1, wherein the welded portions are provided at a corner portion of the opening flange corresponding to a corner portion of the door opening.

4. The vehicle body lateral section structure according to claim 1,
wherein an upper portion of the opening flange has a three-layer structure in which the side panel outer, the reinforcing member, and the inner panel overlap each other, and
wherein a lower portion of the opening flange has a two-layer structure in which the reinforcing member and the inner panel overlap each other.

5. The vehicle body lateral section structure according to claim 4, wherein a portion of the reinforcing member corresponding to the upper portion of the opening flange is formed to have a lower strength than a portion of the reinforcing member corresponding to the lower portion of the opening flange.

6. The vehicle body lateral section structure according to claim 1,
wherein the reinforcing member is formed of an ultra-high-tensile steel plate having a tensile strength of 1500 MPa or more, and
wherein a portion of the reinforcing member provided with the mechanical coupling portion is formed of a high-tensile steel plate having a tensile strength of 490 MPa or more and 1000 MPa or less.

7. The vehicle body lateral section structure according to claim 1,
wherein the opening flange circles in an annular shape, and
wherein the mechanical coupling portions and the welded portions are continuously provided in a circumferential direction of the opening flange.

8. The vehicle body lateral section structure according to claim 1,
wherein an electrical resistance of the side panel outer is smaller than each of an electrical resistance of the reinforcing member and an electrical resistance of the inner panel, and
wherein a plate thickness of the side panel outer is thinner than each of a plate thickness of the reinforcing member and a plate thickness of the inner panel.

9. The vehicle body lateral section structure according to claim 1, wherein the mechanical coupling portion has an adhesive between the side panel outer and the reinforcing member.

10. A method of manufacturing a vehicle body lateral section structure, which is for manufacturing the vehicle body lateral section structure according to claim 1, the method comprising:
a lateral section unit forming step of forming a vehicle body lateral section unit by coupling the side panel outer and the reinforcing member with each other through mechanical coupling; and
a floor coupling step of coupling the inner panel to a floor,
wherein the floor coupling step is provided on a main line for manufacturing a vehicle body by attaching a plurality of members with the floor, and
wherein the lateral section unit forming step is provided on a sub line different from the main line.

11. A method of manufacturing a vehicle body lateral section structure, which is for manufacturing the vehicle body lateral section structure according to claim 1, the method comprising:
a welding step of forming the welded portion by bringing a pair of welding tips into contact with both sides of the side panel outer and the inner panel for energizing,
wherein, in the welding step, a contact area between the side panel outer and one of the welding tips is larger than a contact area between the inner panel and the other of the welding tips.

* * * * *